United States Patent
Line et al.

(10) Patent No.: US 9,399,418 B2
(45) Date of Patent: Jul. 26, 2016

(54) INDEPENDENT CUSHION EXTENSION AND THIGH SUPPORT

(71) Applicant: Ford Global Technologies, LLC, Dearborn, MI (US)

(72) Inventors: Johnathan Andrew Line, Northville, MI (US); Marc Kondrad, Macomb Township, MI (US); John W. Jaranson, Dearborn, MI (US); Kendrick Alden Harper, Temperance, MI (US); Daniel Ferretti, Commerce Township, MI (US); Michael Kolich, Windsor (CA); Lorne Joseph Lovelace, Macomb Township, MI (US); Kevin VanNieulande, Fraser, MI (US); Grant A. Compton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 13/748,862

(22) Filed: Jan. 24, 2013

(65) Prior Publication Data

US 2014/0203617 A1 Jul. 24, 2014

(51) Int. Cl.
*B60N 2/44* (2006.01)
*B60N 2/62* (2006.01)
*B60N 2/02* (2006.01)

(52) U.S. Cl.
CPC ............ *B60N 2/4495* (2013.01); *B60N 2/0284* (2013.01); *B60N 2/62* (2013.01); *B60N 2205/30* (2013.01); *B60N 2205/35* (2013.01)

(58) Field of Classification Search
CPC ........................................................ B60N 2/62

USPC ............................. 297/284.11, 284.3, 423.36
See application file for complete search history.

(56) References Cited

U.S. PATENT DOCUMENTS

| 2,958,369 A | 11/1960 | Pitts et al. |
| 3,403,938 A | 10/1968 | Cramer et al. |

(Continued)

FOREIGN PATENT DOCUMENTS

| EP | 0754590 | 1/1997 |
| EP | 0926969 | 1/2002 |

(Continued)

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

(Continued)

*Primary Examiner* — David R Dunn
*Assistant Examiner* — Jody Giacoman
(74) *Attorney, Agent, or Firm* — Vichit Chea; Price Heneveld LLP

(57) ABSTRACT

A vehicle seating assembly includes a seat frame. A first leg support is pivotally coupled with a forward portion of the seat frame. The first leg support is operable between raised and lowered positions. A first extendable member is disposed on a top portion of the first leg support and is operable between extended and retracted positions. A second leg support is adjacent to and independent of the first leg support and is pivotally coupled with the forward portion of the seat frame. The second leg support is operable between raised and lowered positions. A second extendable member is disposed on a top portion of the second leg support and is operable between extended and refracted positions.

14 Claims, 12 Drawing Sheets

(56) References Cited

U.S. PATENT DOCUMENTS

| | | | |
|---|---|---|---|
| 3,550,953 A * | 12/1970 | Neale | 297/312 |
| 3,929,374 A | 12/1975 | Hogan et al. | |
| 4,324,431 A | 4/1982 | Murphy et al. | |
| 4,334,709 A * | 6/1982 | Akiyama et al. | 297/284.11 |
| 4,353,595 A | 10/1982 | Kaneko et al. | |
| 4,541,669 A * | 9/1985 | Goldner | 297/284.11 |
| 4,629,248 A | 12/1986 | Mawbey | |
| 4,720,141 A | 1/1988 | Sakamoto et al. | |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,597,203 A * | 1/1997 | Hubbard | 297/284.3 |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,350,865 B2 * | 4/2008 | Pearse | 297/312 |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,928 B2 * | 3/2010 | Snyder | 297/284.11 |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 * | 7/2012 | Aldrich et al. | 297/284.11 |
| 8,226,165 B2 | 7/2012 | Mizoi | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2008/0231099 A1 * | 9/2008 | Szczepkowski et al. | 297/284.11 |
| 2009/0039690 A1 * | 2/2009 | Simon et al. | 297/344.1 |
| 2009/0066122 A1 | 3/2009 | Minuth et al. | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |

(56) References Cited

U.S. PATENT DOCUMENTS

| | | |
|---|---|---|
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| WO | WO9511818 | 5/1995 |
| WO | WO9958022 | 11/1999 |
| WO | WO2006131189 | 12/2006 |
| WO | WO2007028015 | 8/2007 |
| WO | WO2008073285 | 6/2008 |
| WO | WO2011021952 | 2/2011 |
| WO | WO2012008904 | 1/2012 |

OTHER PUBLICATIONS

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

M. Grujicic et al., "Seat-cushion and soft-tissue material modeling and a finite element investigation of the seating comfort for passenger-vehicle occupants," Materials and Design 30 (2009) 4273-4285.

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

\* cited by examiner

US 9,399,418 B2

INDEPENDENT CUSHION EXTENSION AND THIGH SUPPORT

FIELD OF THE INVENTION

The present invention generally relates to a vehicle seating assembly, and more particularly to a vehicle seating assembly that includes an independent cushion extension and thigh support.

BACKGROUND OF THE INVENTION

Modern vehicle seats are becoming more and more comfortable as a further understanding of human ergonomics, posture, and comfortability is studied. Vehicle seating assemblies that include comfort components in the vehicle seat back and the vehicle seat can provide the driver and passengers with improved comfort and increased endurance for extensive vehicle rides. Additionally, various sizes and shapes of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY OF THE INVENTION

According to one aspect of the present invention, a vehicle seating assembly includes a seat frame. A first leg support is pivotally coupled with a forward portion of the seat frame. The first leg support is operable between raised and lowered positions. A first extendable member is disposed on a top portion of the first leg support and is operable between extended and retracted positions. A second leg support is adjacent to and independent of the first leg support and is pivotally coupled with the forward portion of the seat frame. The second leg support is operable between raised and lowered positions. A second extendable member is disposed on a top portion of the second leg support and is operable between extended and retracted positions.

According to another aspect of the present invention, a vehicle seating assembly includes a seat frame. A first leg support is pivotally coupled with a forward portion of the seat frame. The first leg support includes a first extendable member disposed on a top portion thereof. A second leg support is independent of the first leg support and is pivotally coupled with the forward portion of the seat frame. The second leg support includes a second extendable member disposed on a top portion thereof.

According to yet another aspect of the present invention, a vehicle seating assembly includes a seat frame supporting a pivot rod and first and second distinct leg supports. Each of the first and second distinct leg supports includes a body portion and a flange that extends over the pivot rod. The flange is spring-biased and operably coupled to a motor that pivots the first and second distinct leg supports between raised and lowered positions. Each of the first and second distinct leg supports includes an extendable member slidably coupled therewith.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
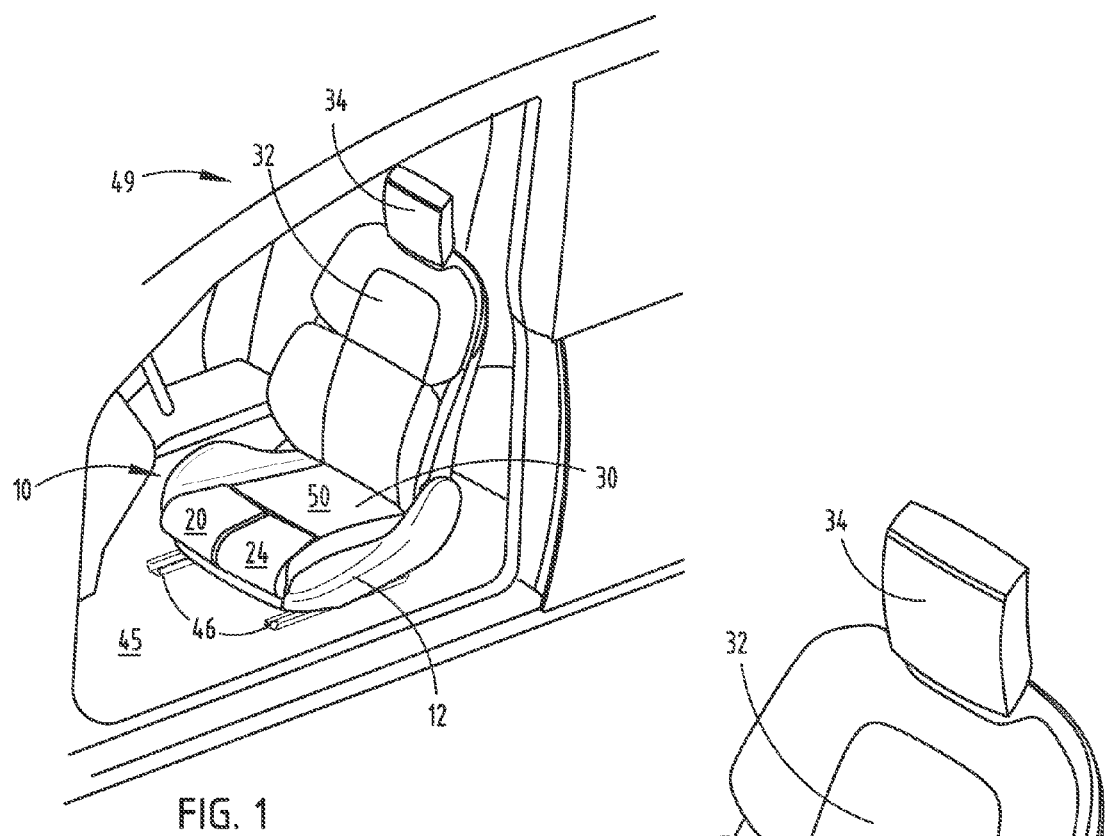
FIG. 1 is a top perspective view of one embodiment of a vehicle seating assembly of the present invention disposed in a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
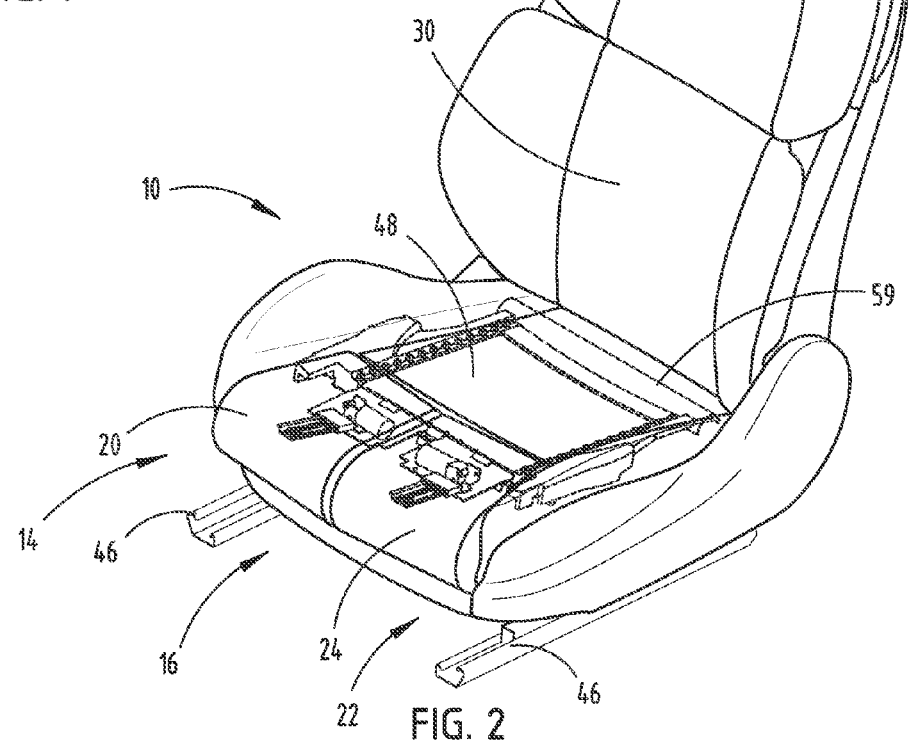
FIG. 2 is a top perspective view of the vehicle seating assembly of FIG. 1.

Referring to FIGS. 1 and 2, reference numeral 10 generally designates a vehicle seating assembly having a seat frame 12.

A first leg support 14 is pivotally coupled with a forward portion 16 of the seat frame 12. The first leg support 14 is operable between raised and lowered positions. A first extendable member 20 is disposed on the first leg support 14 and is operable between extended and retracted positions. A second leg support 22 is adjacent to and independent of the first leg support 14 and is pivotally coupled with the forward portion 16 of the seat frame 12. The second leg support 22 is operable between raised and lowered positions. A second extendable member 24 is disposed on the second leg support 22 and is operable between extended and retracted positions.

Referring again to FIGS. 1 and 2, the vehicle seating assembly 10 generally includes a seat 30 and a seat back 32 that supports a headrest 34 thereon. The seat back 32 is pivotally coupled with the seat 30, such that the seat back 32 can be moved between upright and inclined positions. The headrest 34 is operably coupled with the seat back 32 and also positioned in a variety of positions relative to the seat back 32 to support the head and neck of a driver or a passenger. The seat frame 12 includes first and second side members 40, 42 (FIG. 4) supported on legs 44 (FIG. 5). Laterally extending frame members 43 (FIG. 5) extend between the first and second side members 40, 42. The legs 44 are operably coupled with slide assemblies 46 that are secured to a floor 45 of a vehicle 49.

Figure 3:
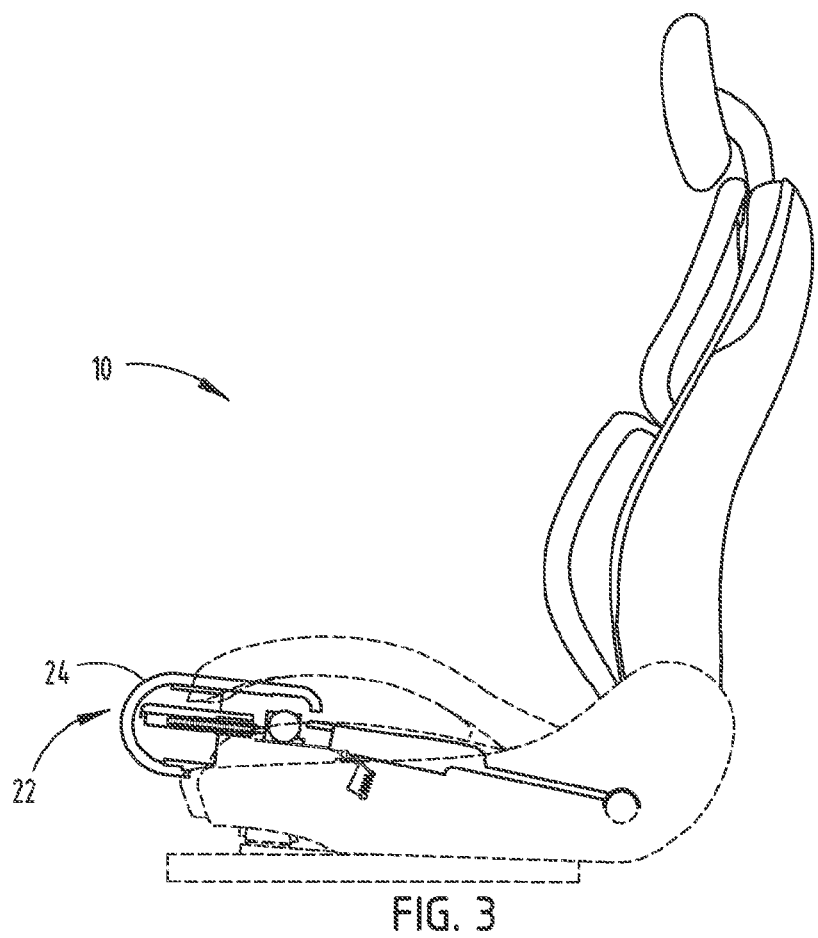
FIG. 3 is a side elevational view of a vehicle seating assembly of the present invention.
Figure 4:
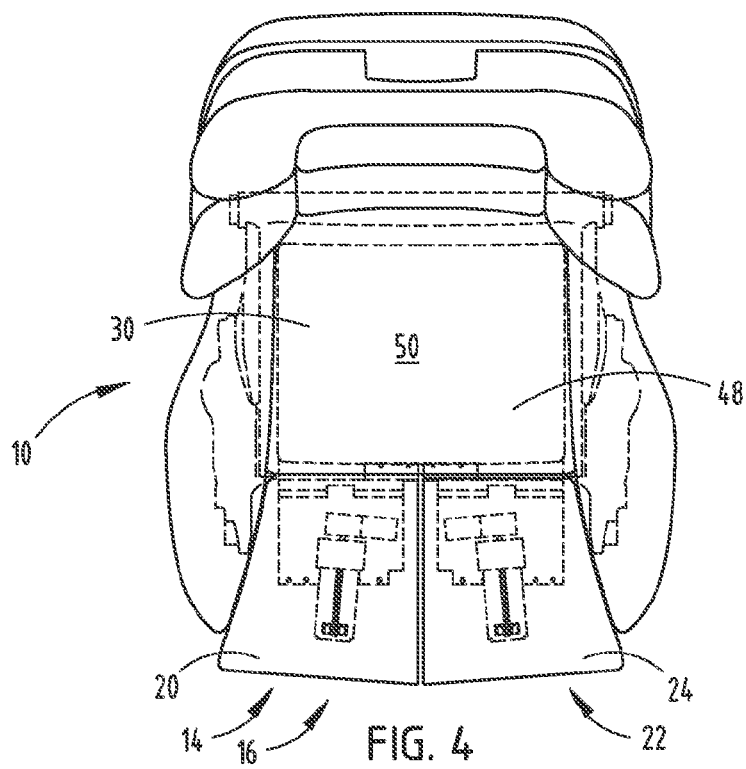
FIG. 4 is a top plan view of the vehicle seating assembly of FIG. 3.
Figure 5:
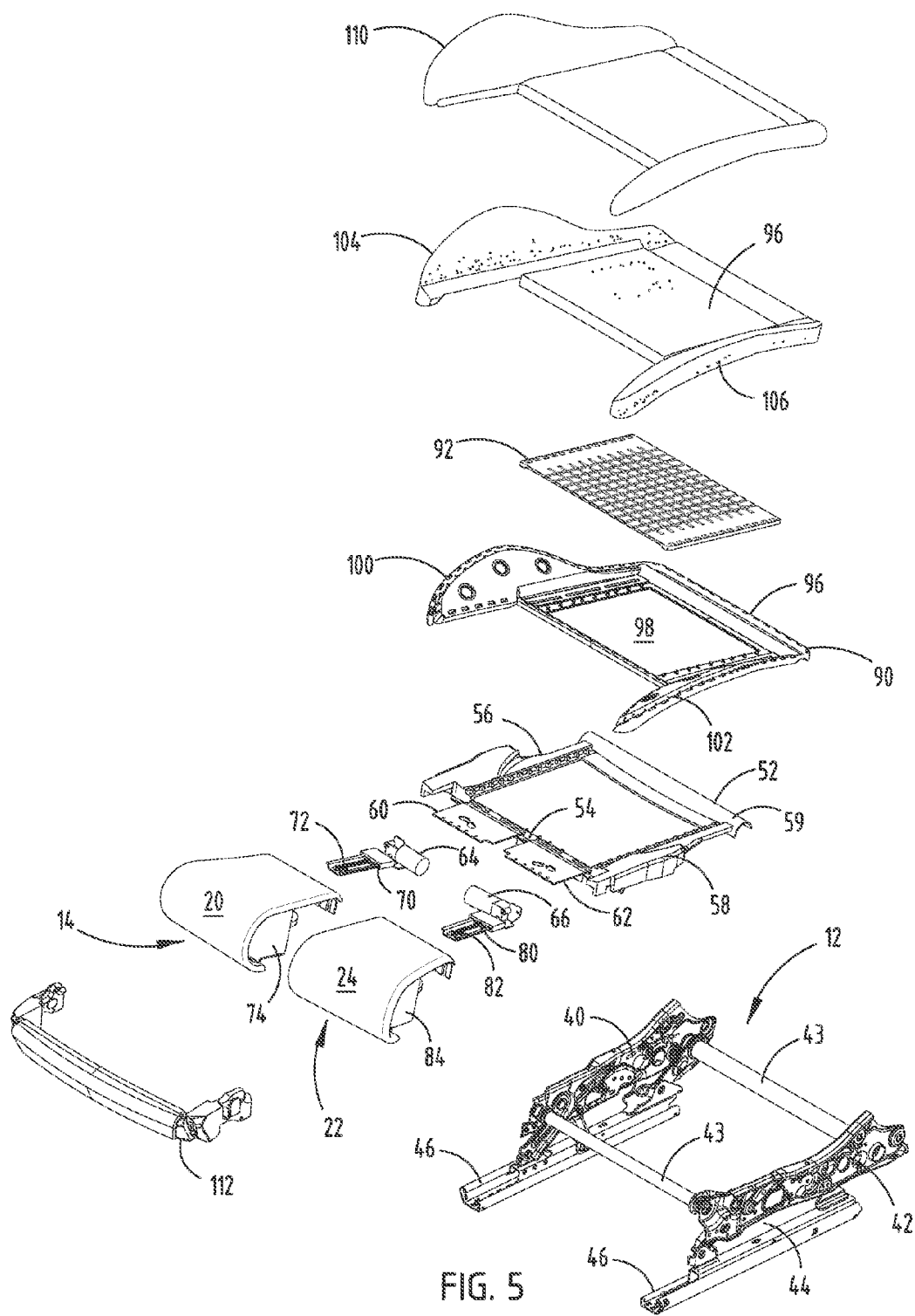
FIG. 5 is a top perspective exploded view of the seat of the vehicle seating assembly of FIG. 3.

Referring now to FIGS. 3 and 4, the vehicle seating assembly 10 is generally configured to apply selective support to the underside of the legs of the driver or passenger. Specifically, as shown in FIG. 3, each leg of the driver or passenger can be independently supported by an independent leg support. The first and second leg supports 14, 22 are moveable between raised and lowered positions, as well as between extended and retracted positions to modify an effective seating area 48 of the seat 30 and accommodate the size, shape, posture, and sitting positions of the driver or passenger.

Referring now to FIG. 5, the vehicle seating assembly 10 includes a seat base 50 that is supported over the seat frame 12. An interface member 52 is positioned between the seat frame 12 and the seat base 50. The seat base 50 is disposed behind the first and second leg supports 14, 22, and in front of the seat back 32. The interface member 52 includes a pivot rod 54 that extends between first and second sides 56, 58 of the interface member 52. Additionally, a rear portion of the interface member 52 includes a frame engagement component 59 that secures the interface member 52 to the seat frame 12. The pivot rod 54 also includes first and second support bases 60, 62 that support the first and second leg supports 14, 22, respectively. The first and second support bases 60, 62 are operably coupled with first and second motors 64, 66. The first motor 64 is operably coupled with a slide 70 and a drive shaft 72. The drive shaft 72 is capable of laterally translating a support body 74 between extended and retracted positions. The first support base 60 is configured to rotate the first leg support 14 about the pivot rod 54 between the raised and lowered positions, as discussed in further detail herein. Similarly, the second motor 66 is operably coupled with a slide 80 and a drive shaft 82. The drive shaft 82 is capable of laterally translating a support body 84 of the second leg support 22 between extended and retracted positions. The second support base 62 is configured to rotate the second leg support 22 between the raised and lowered positions.

Referring again to FIG. 5, the interface member 52 includes a suspension frame 90 disposed thereon. The suspension frame 90 is configured to provide sufficient support to a suspension member 92 and a seat cushion 94. Accordingly, the suspension frame 90 includes a shape that largely complements the shape of the seat cushion 94. Specifically, the suspension frame 90 includes a body 96 defining an aperture 98 configured to receive the suspension member 92, which supports the seat cushion 94. At the same time, first and second wings 100, 102 extend from the body 96 and are configured to support first and second side cushions 104, 106 of the seat cushion 94. The seat cushion 94 is supported above the suspension frame 90 and is protected by a coverstock 110. It is anticipated that the coverstock 110 could be any of a variety of materials, including traditional fabrics, as well as leathers, vinyls, etc. A lateral seat brace 112 is positioned below the first and second leg supports 14, 22 and is coupled to the seat frame 12. The lateral seat brace 112 assists in guiding the first and second leg supports 14, 22 between the various positions, and at the same time, provides additional rigidity to the seat frame 12 of the vehicle seating assembly 10. The lateral seat brace 112 also includes a shroud that protects a forward portion of the vehicle seating assembly 10 and is aesthetically pleasing to view.

Figure 6:
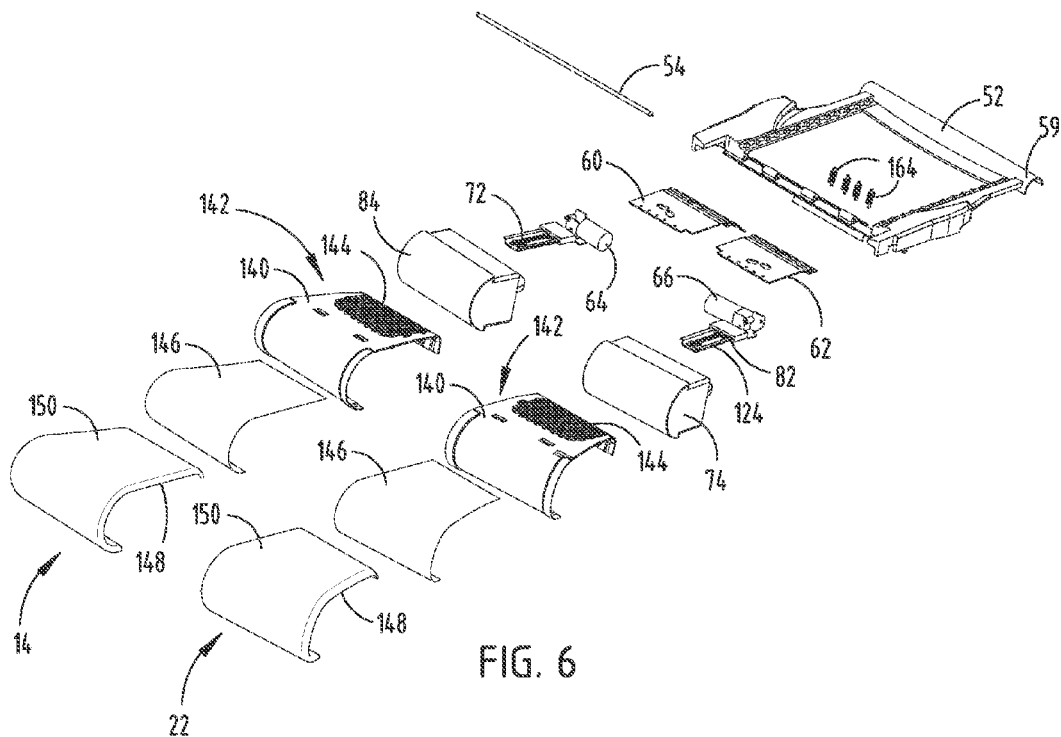
FIG. 6 is a top perspective exploded view of a portion of the seat of the vehicle seating assembly of FIG. 3.
Figure 7:
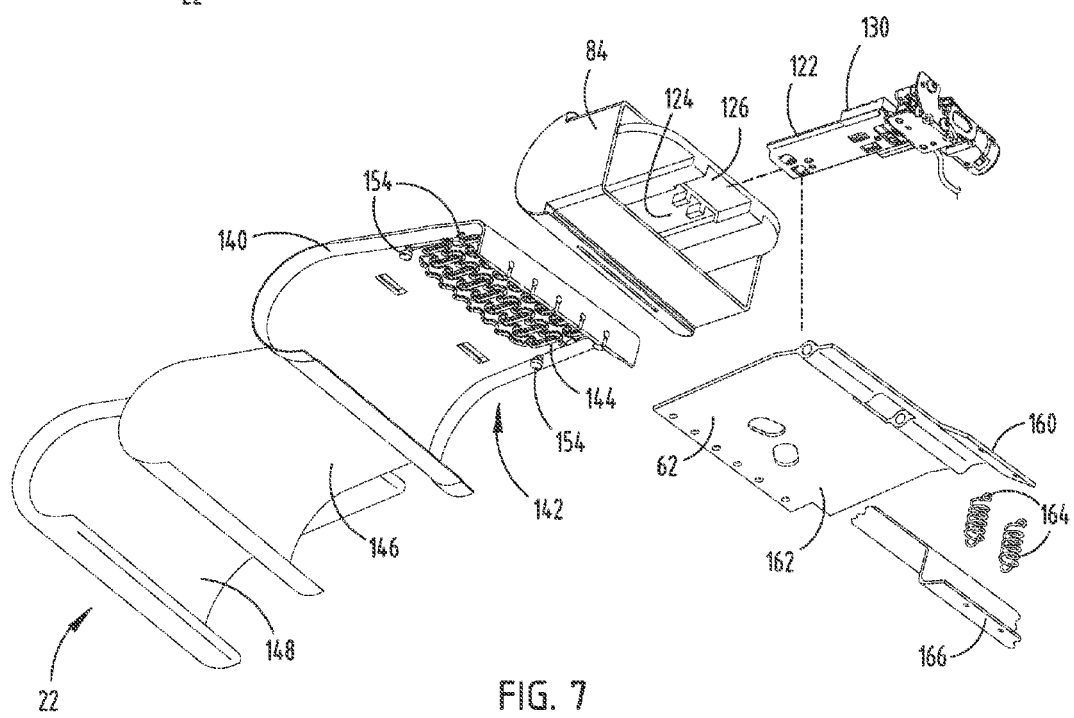
FIG. 7 is a bottom perspective exploded view of a portion of the seat of the vehicle seating assembly of FIG. 3.
Figure 9:
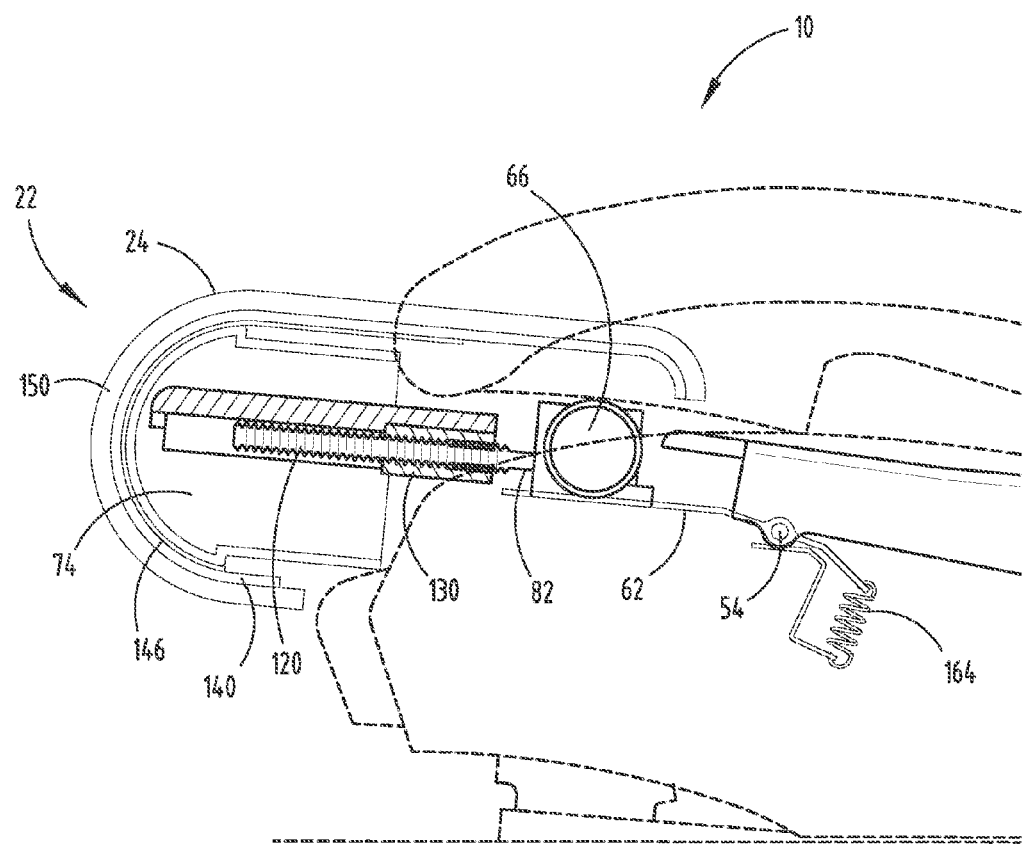
FIG. 9 is a partial side cross-sectional elevational view taken at line IX-IX illustrating the leg supports of FIG. 8 in a retracted position.

Referring now to FIGS. 6 and 7, the first and second leg supports 14, 22 will be discussed in further detail. The first and second leg supports 14, 22 are configured to engage the interface member 52 of the vehicle seating assembly 10. Specifically, the first and second support bases 60, 62 are pivotally coupled with the pivot rod 54 that is rotatably or fixedly coupled with the interface member 52 of the vehicle seating assembly 10. The first and second support bases 60, 62 are operable between the raised and lowered positions about the pivot rod 54. The first and second motors 64, 66 of the first and second leg supports 14, 22, respectively, are positioned on the first and second support bases 60, 62. The first and second motors 64, 66 are operably coupled with the drive shafts 72, 82, respectively. Each drive shaft 72, 82 includes a screw gear 120 (FIG. 9) disposed thereon. The screw gear 120 allows for linear translation of the first and second leg supports 14, 22 between the extended and retracted positions, as discussed below.

Referring again to FIGS. 6 and 7, each of the first and second leg supports 14, 22 includes a slide assembly 122. The support bodies 74, 84 are configured to engage the slide assembly 122. The support bodies 74, 84 of the first and second leg supports 14, 22 include a receiving slot 124 configured to receive a portion of the slide assembly 122. Each receiving slot 124 includes an enlarged recess 126 that is configured to receive a slide block 130 on the slide assembly 122. The slide block 130 is linearly translatable via the screw gear 120 between fore and aft positions. The slide block 130 is configured to engage the enlarged recess 126, thereby coupling the support body 74 or 84 with the slide assembly 122. As described in further detail below, when the slide block 130 is in the aft position, the relevant leg support 14 or 22 is in the retracted position. Similarly, when the slide block 130 is in the fore position, the relevant leg support 14 or 22 is in the extended position.

Referring again to FIGS. 6 and 7, each support body 74, 84 is generally configured to be coupled with a flex member 140 disposed thereon. The flex member 140 includes an open matrix 142 of flex apertures 144 that provide additional comfort and flexibility for the driver or passenger. At the same time, the flex apertures 144 provide some breathability in the first and second leg supports 14, 22 of the vehicle seating assembly 10. The flex member 140 is positioned on top of the support body 74 or 84 and is covered by a protective wrap 146. The protective wrap 146 is covered by a leg support coverstock 148 and a cushion layer 150. The leg support coverstock 148 and the cushion layer 150 protect the wrap 146 and the flex member 140. As shown in FIG. 7, each support body 74, 84 includes a number of engagement pins 154 that secure the flex member 140 to the support bodies 74, 84. Each of the first and second support bases 60, 62 of the first and second leg supports 14, 22, respectively, includes a rearwardly extending flange 160 that extends on an opposite side from a body 162 of the first and second support bases 60, 62. The rearwardly extending flange 160 is coupled with tension springs 164 that are coupled to a mounting bracket 166. The tension springs 164 bias the relevant support base 60 or 62 to the raised position. It is generally contemplated that the support body 74 of the first leg support 14 and the support body 84 of the second leg support 22 may be moveable to the raised position and the lowered position via an actuation assembly operably coupled with a motor. Alternatively, adjustment of the first and second leg supports 14, 22 may be made manually via a gear system, as understood by one having ordinary skill in the art.

Figure 8:
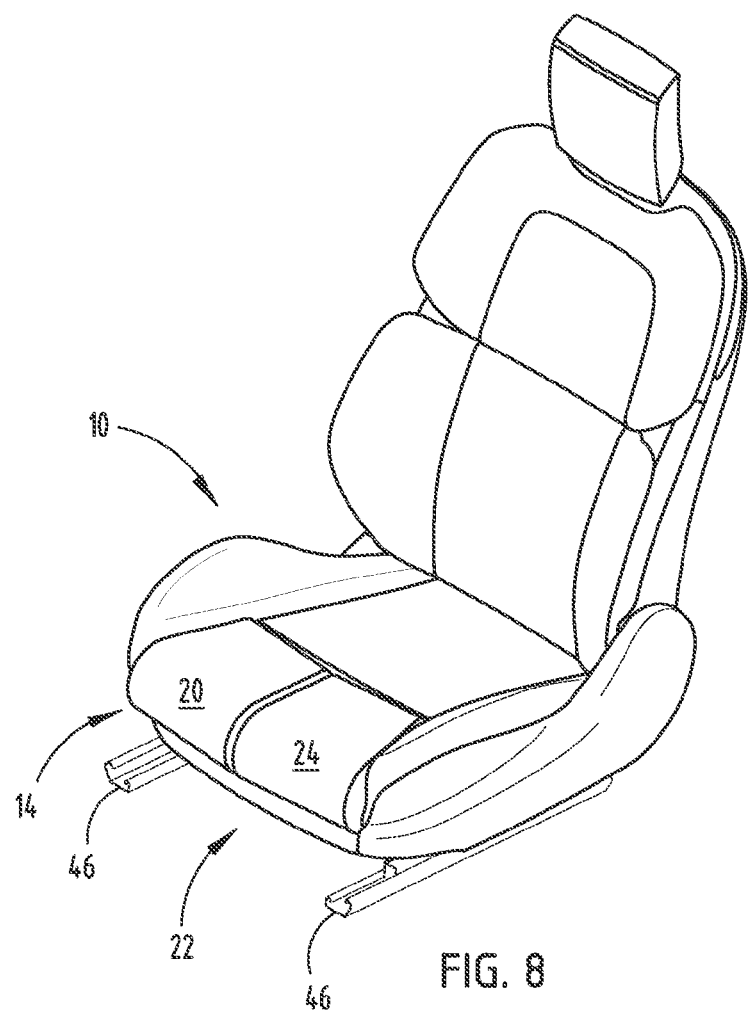
FIG. 8 is a top perspective view of the vehicle seating assembly of FIG. 3 with first and second leg supports in the retracted and lowered positions.
Figure 8A:
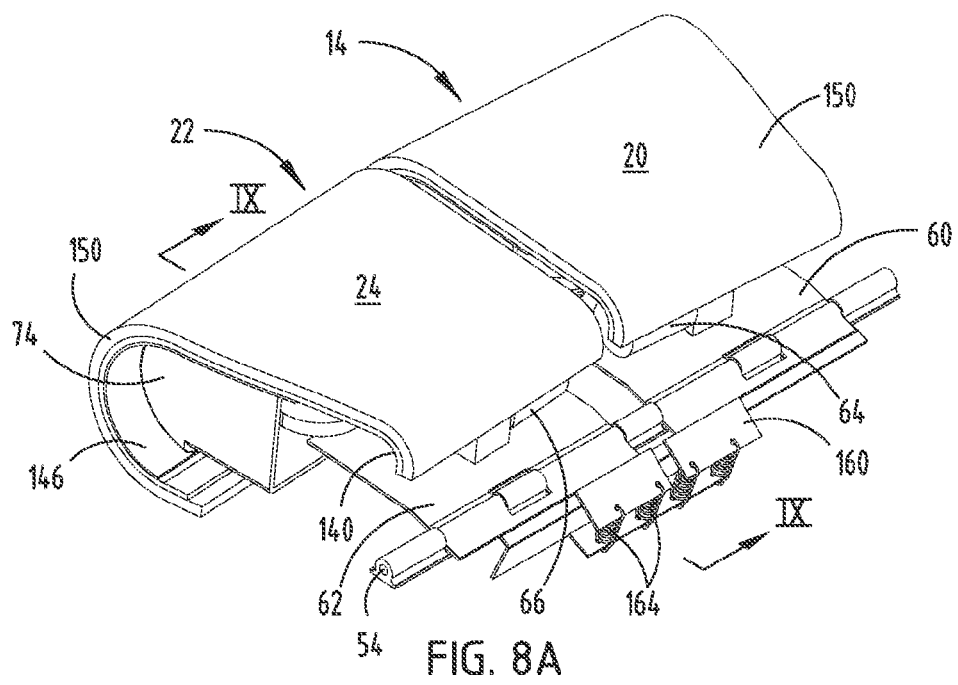
FIG. 8A is a top perspective view of the leg supports of FIG. 8.

Referring now to FIGS. 8 and 8A, the vehicle seating assembly 10 is illustrated with the first and second leg supports 14, 22 moved to an initial position. In the initial position, the first and second leg supports 14, 22 are in the retracted position and also in the lowered position. In this initial position, the seating area 48 of the seat 30 has not been enlarged. Accordingly, the seating area 48 is generally configured to support a driver or passenger that is smaller in stature. In the event the driver or passenger has a larger stature and wishes to change the effective seating area 48 of the vehicle seating assembly 10, then the first and second leg supports 14, 22 can be raised independently and also extended independently.

Figure 10:
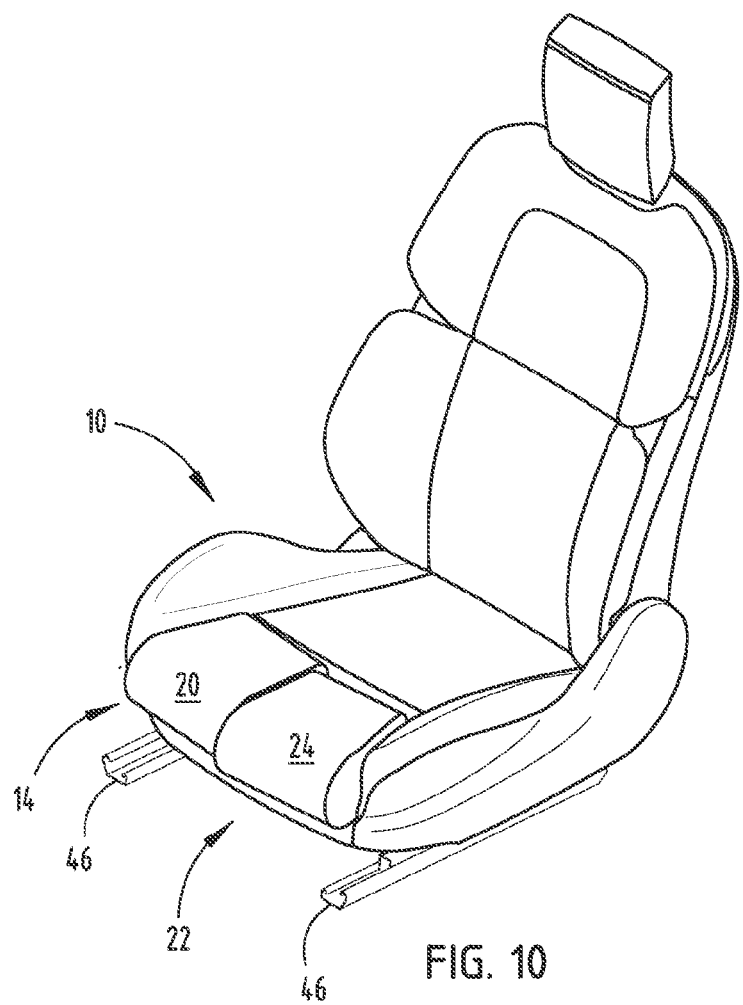
FIG. 10 is a top perspective view of the vehicle seating assembly of the present invention with one of the leg supports in a lowered position.
Figure 10A:
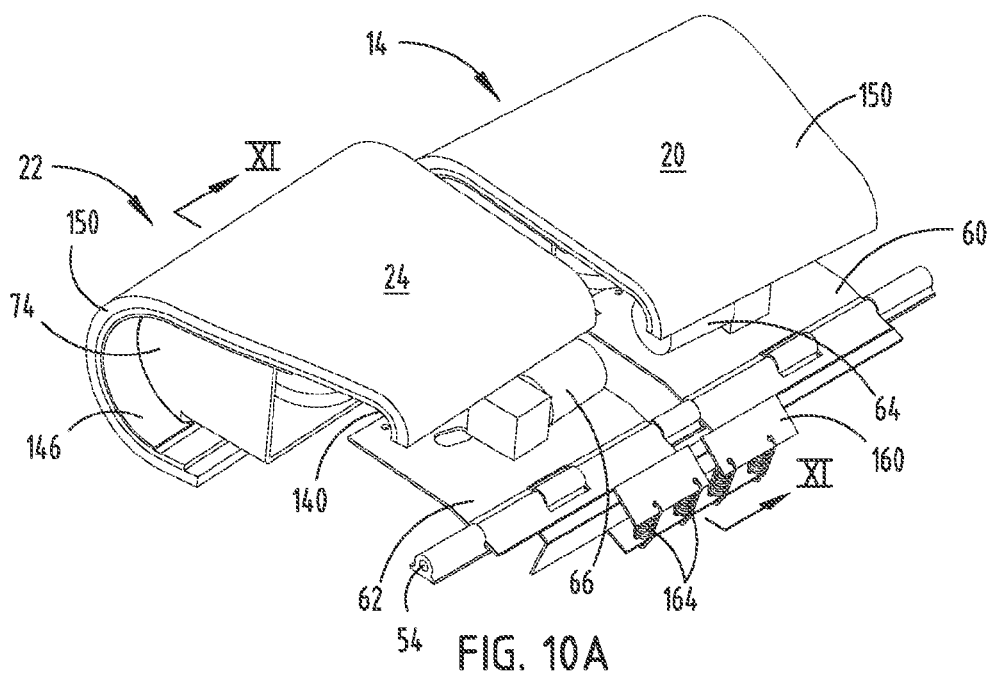
FIG. 10A is a top perspective view of the leg supports of FIG. 10 with one of the leg supports in a lowered position.

Referring now to FIGS. 10 and 10A, in the illustrated embodiment, the second leg support 22 has been translated to the extended position. To move the second leg support 22 to the extended position, the driver or passenger would simply engage a toggle switch on the seat 30 that is operably coupled to the second motor 66. The second motor 66 then activates, which turns the drive shaft 82 that is coupled with the screw gear 120. As the screw gear 120 rotates, the support body 84 of the second leg support 22 is pushed outwardly away from the seat base 50. At the same time, the first leg support 14 maintains position and does not move. In the event the driver or passenger also wanted the first leg support 14 to be moved to the extended position, the driver or passenger could engage in the same behavior to actuate the first motor 64, which would then force the support body 74 of the first leg support 14 outward in a similar fashion to that described above with reference to the second leg support 22.

Figure 11:
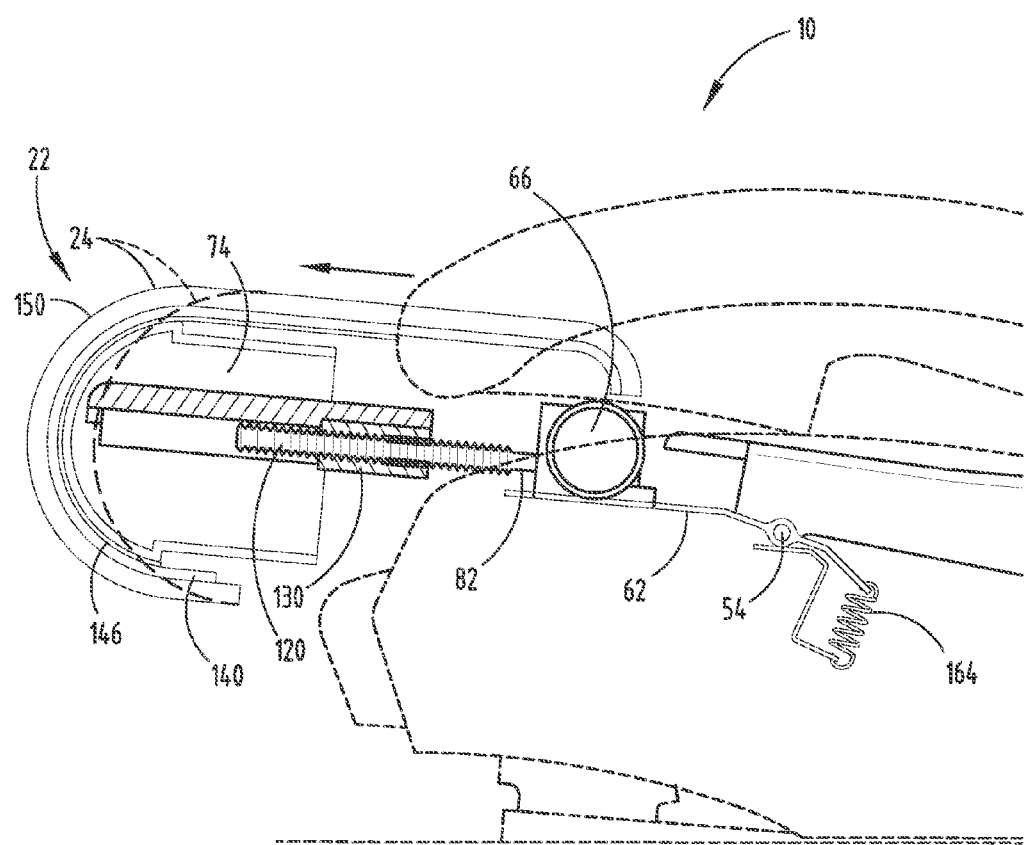
FIG. 11 is a partial side elevational cross-sectional view taken at line XI-XI of FIG. 10A illustrating one of the leg supports in an extended position.

As shown in FIG. 11, as the screw gear 120 rotates, the slide block 130 begins to move relative to the screw gear 120. Specifically, when the second motor 66 operates in a first direction, the screw gear 120 rotates such that threads of the screw gear 120 push internal threads of the slide block 130, which translates the slide block 130 and the second leg support 22 away from the seat base 50 (corresponding to the extended position of the second leg support 22). When the second motor 66 operates in a second direction, the screw gear 120 turns in a second direction opposite the first direction, such that the slide block 130 is drawn toward the seat base 50 (corresponding with the retracted position of the second leg support 22).

Figure 12:
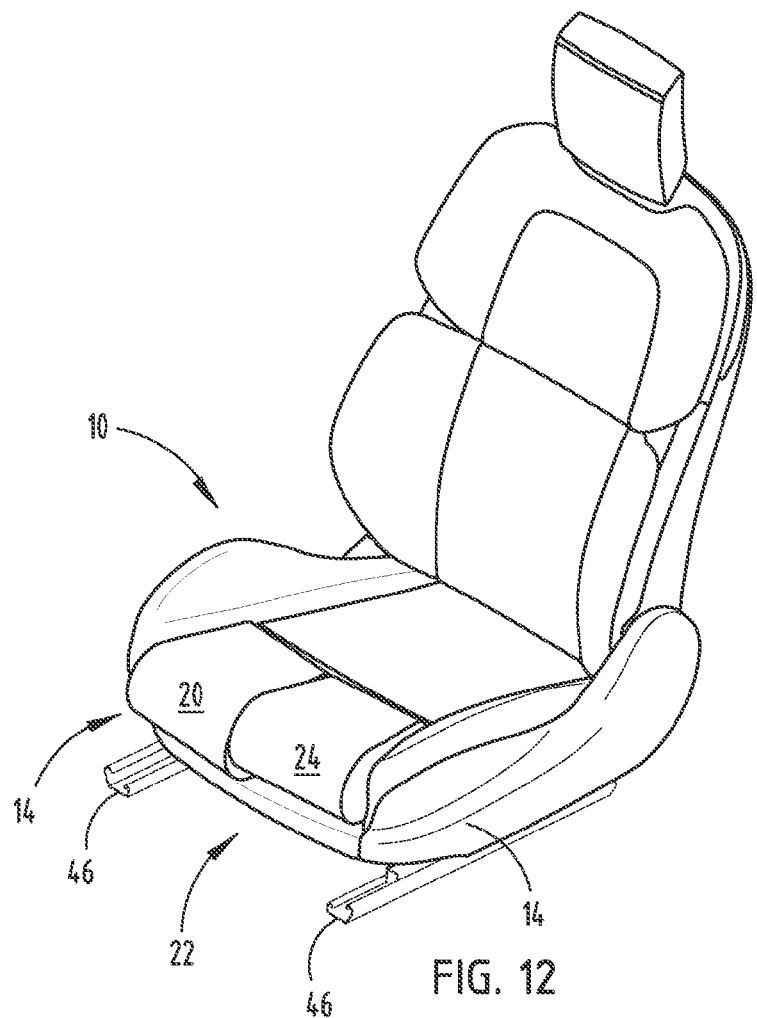
FIG. 12 is a top perspective view of one embodiment of the vehicle seating assembly of the present invention with one of the leg supports in a raised position.
Figure 12A:
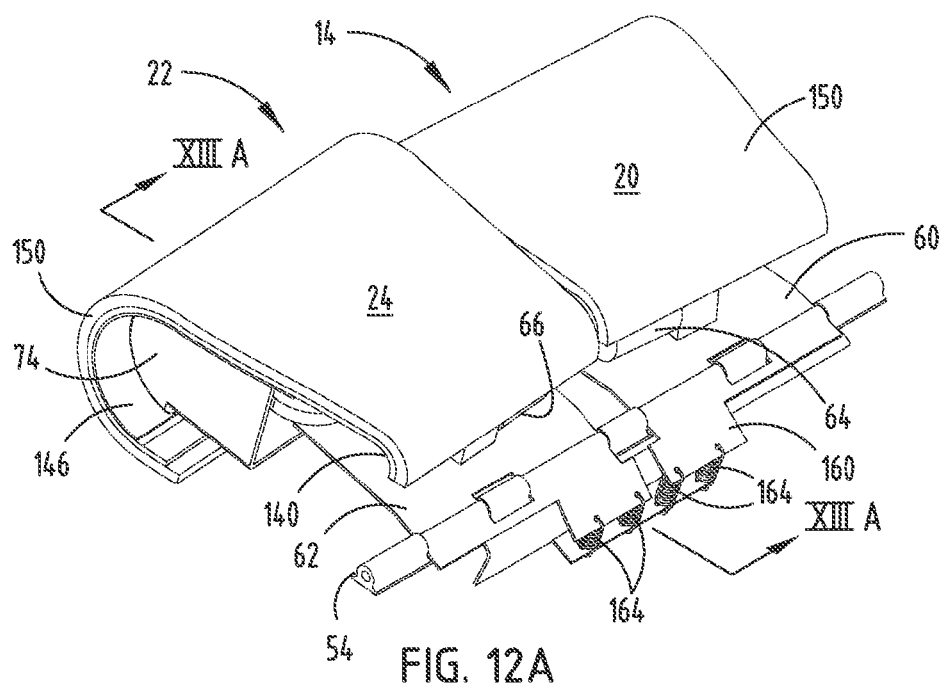
FIG. 12A is a top perspective view of the leg supports of FIG. 12 with one of the leg supports in the raised position.

Referring now to FIGS. 12 and 12A, the vehicle seating assembly 10 is illustrated with the second leg support 22 in a raised position. In the raised position, the second leg support 22 is better situated to hold or support the underside of a leg of the driver or passenger when the leg is not extended. The second leg support 22 is moved to the raised position under the force of the tension springs 164 alone, or under the force of the tension springs 164 and a motor operably coupled to the second support base 62 that urges the second leg support 22 to the raised position. The first leg support 14 operates in much the same way. Notably, the first and second leg supports 14, 22 may be at the lowered position, the raised position, or any position therebetween simultaneously. However, the first and second leg supports 14, 22 may also be placed at different positions. For example, the first leg support 14 may be at the lowered position, while the second leg support 22 may be at the raised position. Moreover, at the same time, regardless of the raised or lowered positions of the first and second leg supports 14, 22, the first and second leg supports 14, 22 may also be at the extended or refracted positions. Again, the first and second leg supports 14, 22 may be placed at the retracted position or the extended position simultaneously. Alternatively, the first and second leg supports 14, 22 may be positioned differently. For example, the first leg support 14 may be at the lowered position and the retracted position, while the second leg support 22 may be at the extended position and the raised position.

Figure 13A:
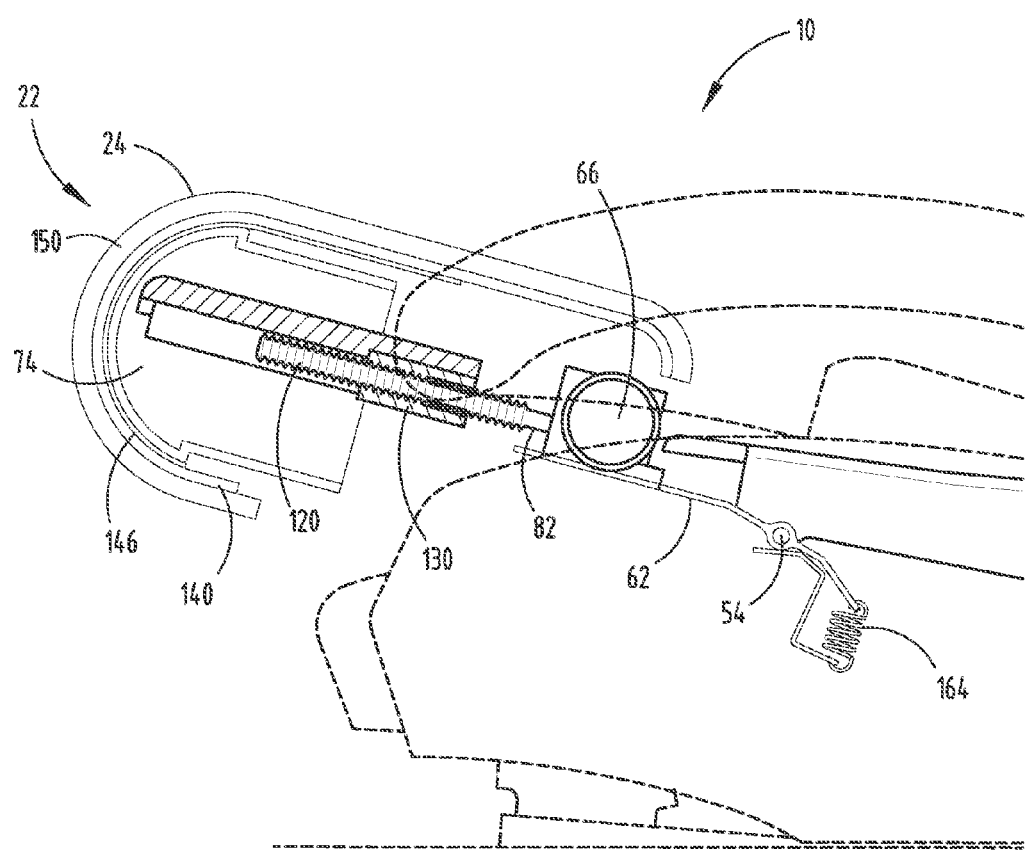
FIG. 13A is a partial side elevational cross-sectional view taken at XIIIA-XIIIA of the leg support of FIG. 12A in the raised position.
Figure 13B:
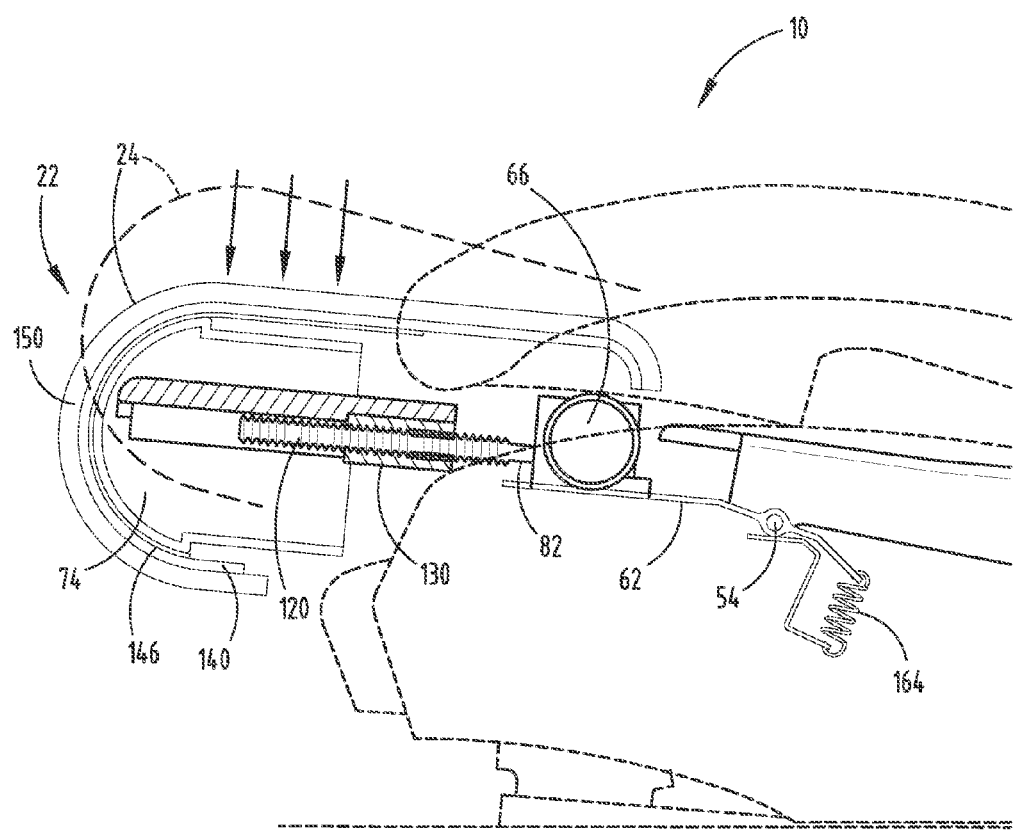
FIG. 13B is a partial side elevational cross-sectional view of the leg support of FIG. 13A after movement from the raised position to the lowered position.
Figure 13C:
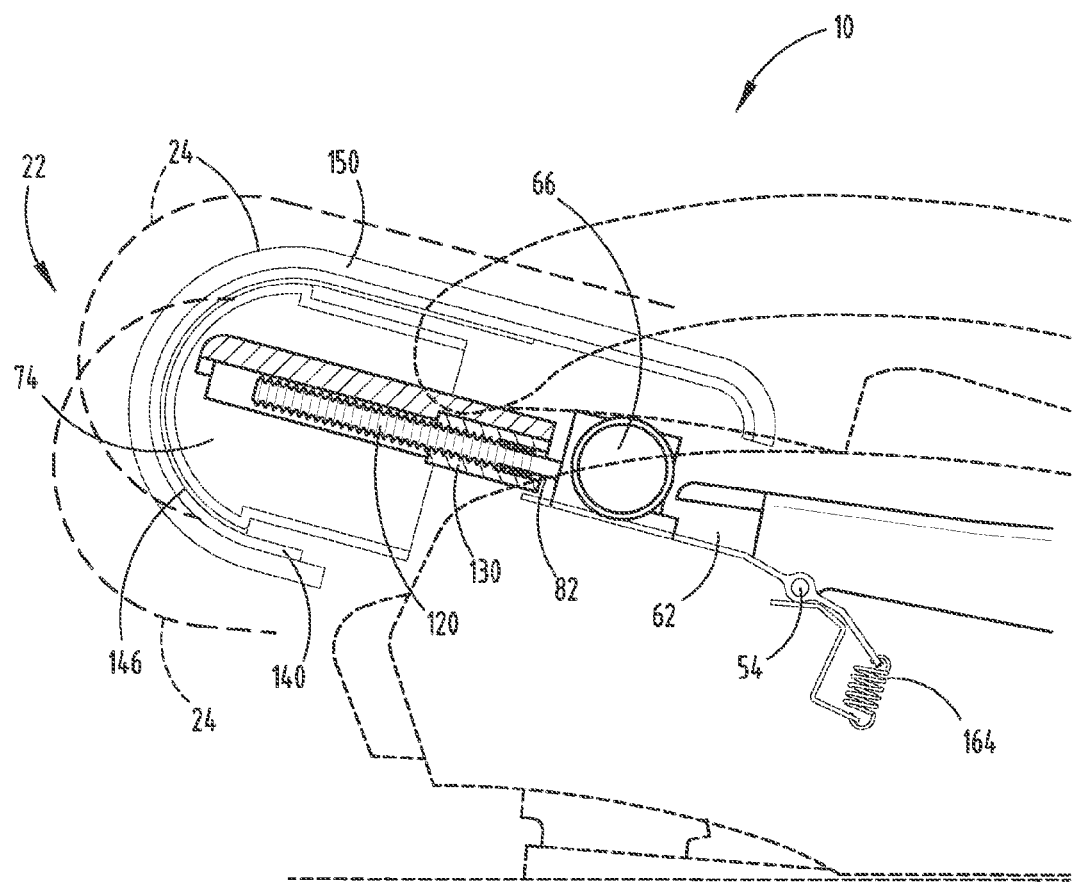
FIG. 13C is a partial side elevational cross-sectional view of the leg support of FIG. 13B after movement to the raised position and the retracted position.

As shown in the illustrated embodiment of FIGS. 13A and 13B, the first support base 62 of the second leg support 22 upon which the motor 66 is positioned is rotated upwardly (clockwise). As generally noted above, movement of the second leg support 22 by way of the second support base 62 can occur by the force of the tension springs 164 coupling the rearwardly extending flange 160 to the mounting bracket 166 in the seat 30, by a motor that is operably coupled with the second support base 62 to rotate the second support base 62 between the raised and lowered positions, or can be by way of a motor that is supplemented by the tension springs 164 that extend between the rearwardly extending flange 160 and the mounting bracket 166. It will be understood, as shown in FIG. 13C, that the first and second leg supports 14, 22 can be in the raised or lowered position, or any position therebetween, and at the same time, be in the extended or retracted position. FIG. 13C illustrates the second leg support 22 in the raised position and the retracted position. Movement of the first and second leg supports 14, 22 between the raised and lowered positions is independent of movement of the first and second leg supports 14, 22 between the extended and retracted positions.

The vehicle seating assembly as disclosed herein includes first and second independently moveable leg supports configured to provide independent support to the legs of a driver or passenger. For example, for a driver, frequently, the right leg of the driver is in an extended position to actuate the pedals. At the same time, the left leg of the driver is retracted to provide comfort to the driver. The vehicle seating assembly as disclosed herein can allow for additional support under the right leg of the driver, thereby minimizing the likelihood that the endurance of the driver will wane over long trips. The vehicle seating assembly as disclosed herein also provides additional comfort as the leg supports can be specifically moved and adjusted to conform to the preferred seating style of a particular driver or passenger.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a seat frame;
   a first support base pivotal about a forward portion of the seat frame and including a first portion of a forward seating surface, the first support base being operable between raised and lowered positions;
   a first extendable member disposed on a top portion of the first support base;
   a first motor disposed on the first support base and operable to move the first extendable member between extended and retracted positions;
   a second support base adjacent to and independent of the first support base and pivotal about the forward portion of the seat frame and including a second portion of the forward seating surface, the second support base being operable between raised and lowered positions;
   a second extendable member disposed on a top portion of the second support base and operable between extended and retracted positions;
   a second motor disposed on the second support base and operable to move the second extendable member between extended and retracted positions.

2. The vehicle seating assembly of claim 1, further comprising:
   a first leg support operably coupled to the first support base by a first slide assembly, and a second leg support operably coupled to the second support base by a second slide assembly.

3. The vehicle seating assembly of claim 1, further comprising:
   a pivot rod that pivotally couples each of the first and second support bases to the seat frame.

4. The vehicle seating assembly of claim 3, wherein the first and second motors include screw gears operably coupled with the first and second extended members, respectively, which translate the first and second extendable members between the extended and retracted positions.

5. The vehicle seating assembly of claim 1, wherein the first and second support bases are spring-biased to the raised position.

6. The vehicle seating assembly of claim 1, wherein the first support base includes a rearwardly extending flange coupled with a tension spring that biases the first support base to the raised position.

7. The vehicle seating assembly of claim 1, wherein each of the first and second extendable members include a support body and a flex member disposed over the support body.

8. The vehicle seating assembly of claim 1, further comprising:
   a seat base disposed behind the first and second support bases.

9. A vehicle seating assembly comprising:
   a seat frame;
   first and second support bases pivotal about a forward portion of the seat frame and including first and second extendable members, respectively, each extendable member having a flex member supporting a cushion thereon; and
   first and second motors disposed on the first and second support bases, respectively, the first and second motors coupled with and configured to extend and retract the first and second extendable members.

10. The vehicle seating assembly of claim 9, further comprising:
    a first slide assembly that couples a first leg support to the first support base and a second slide assembly that couples a second leg support to the second support base.

11. The vehicle seating assembly of claim 9, further comprising:
    a pivot rod extending behind the first and second support bases, the pivot rod pivotally coupling each of the first and second support bases to the seat frame.

12. The vehicle seating assembly of claim 9, further comprising:
    a seat base disposed behind the first and second support bases.

13. The vehicle seating assembly of claim 9, wherein the first and second support bases are spring-biased to the raised position.

14. The vehicle seating assembly of claim 9, wherein each of the first and second support bases includes a rearwardly extending flange coupled with a tension spring that biases the first and second support bases to the raised position.

* * * * *